United States Patent [19]
Anderson

[11] Patent Number: 5,845,888
[45] Date of Patent: Dec. 8, 1998

[54] RETRACTABLE CONTAINER HOLDER

[75] Inventor: Rick A. Anderson, Grand Haven, Mich.

[73] Assignee: Prince Corporation, Holland, Mich.

[21] Appl. No.: 895,731

[22] Filed: Jul. 17, 1997

[51] Int. Cl.[6] .................................................. A47K 1/08
[52] U.S. Cl. ........................................ 248/311.2; 224/926
[58] Field of Search ............................ 248/311.2, 309.1;
297/188.16, 188.17; 224/281, 926, 539,
542; 296/37.12, 37.14

[56] References Cited

U.S. PATENT DOCUMENTS

| | | | |
|---|---|---|---|
| 2,778,702 | 1/1957 | Franks . | |
| 4,583,707 | 4/1986 | Anderson . | |
| 4,756,572 | 7/1988 | Dykstra et al. | 297/188.17 |
| 4,759,584 | 7/1988 | Dykstra et al. . | |
| 4,907,775 | 3/1990 | Lorence et al. | 248/311.2 |
| 5,018,633 | 5/1991 | Toth et al. | 248/311.2 |
| 5,259,580 | 11/1993 | Anderson et al. | 248/311.2 |
| 5,297,709 | 3/1994 | Dykstra et al. | 248/311.2 X |
| 5,379,978 | 1/1995 | Patel et al. | 248/311.2 |
| 5,489,054 | 2/1996 | Schiff | 297/188.17 X |

FOREIGN PATENT DOCUMENTS 490938A  3/1992  Japan .

*Primary Examiner*—Ramon O. Ramirez
*Attorney, Agent, or Firm*—Price, Heneveld, Cooper, DeWitt & Litton

[57] ABSTRACT

A container holder assembly comprises a four-bar linkage which is mounted to a slide assembly slideably mounted within a frame such that when extended, the container holder defined by an upper link having an aperture therein and a lower link having a floor therein is raised above and extends outwardly from a vehicle armrest. In a preferred embodiment of the invention, the container holder includes a locking member for interengaging said frame when the container holder is pivoted to a use position, thereby locking the container holder in an extended use position once pivoted outwardly from the slide subassembly.

20 Claims, 3 Drawing Sheets

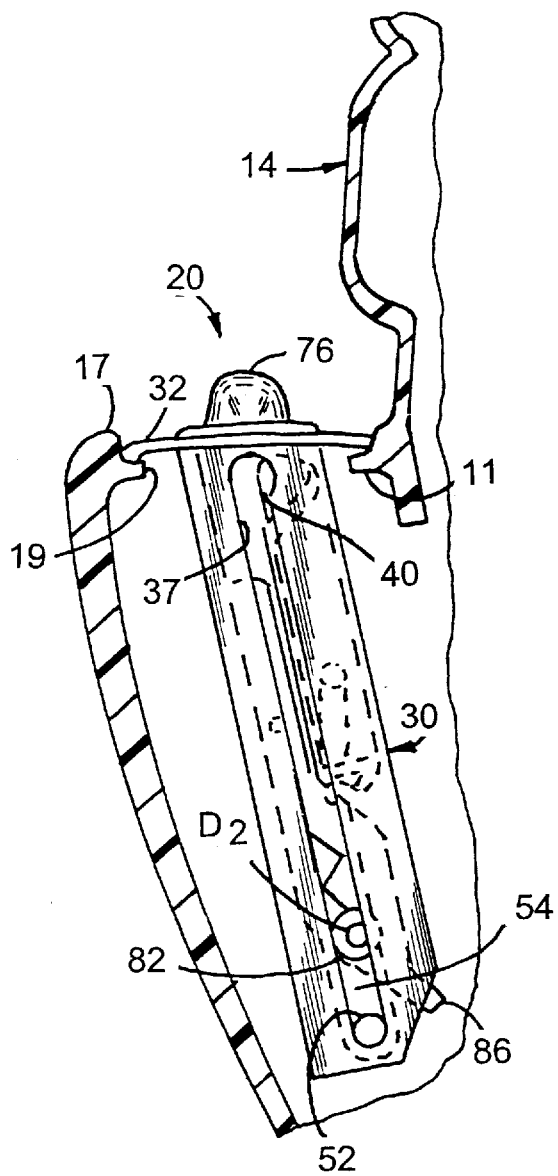
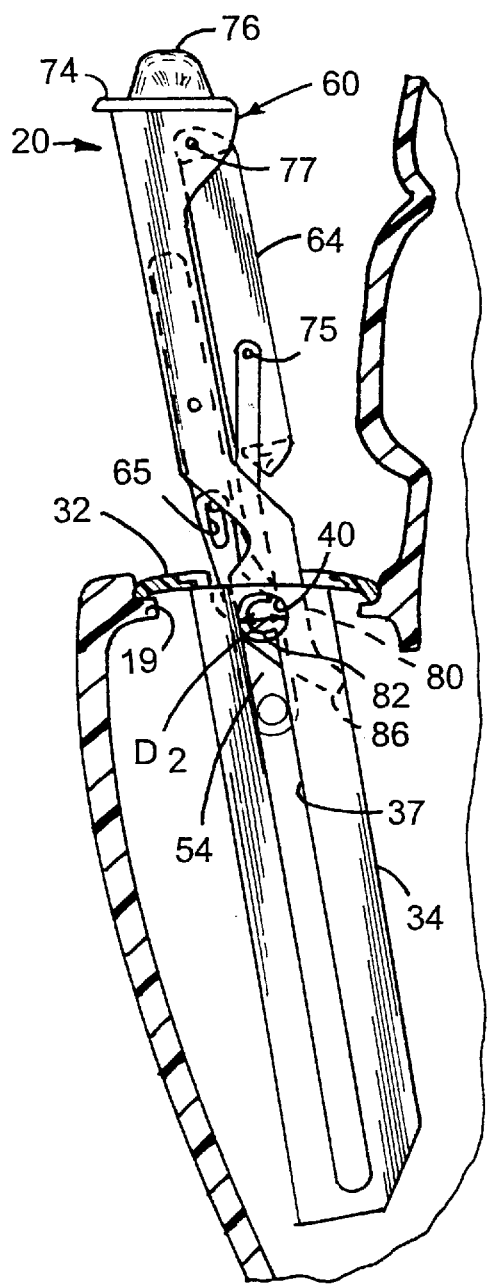
Fig. 2
Fig. 3

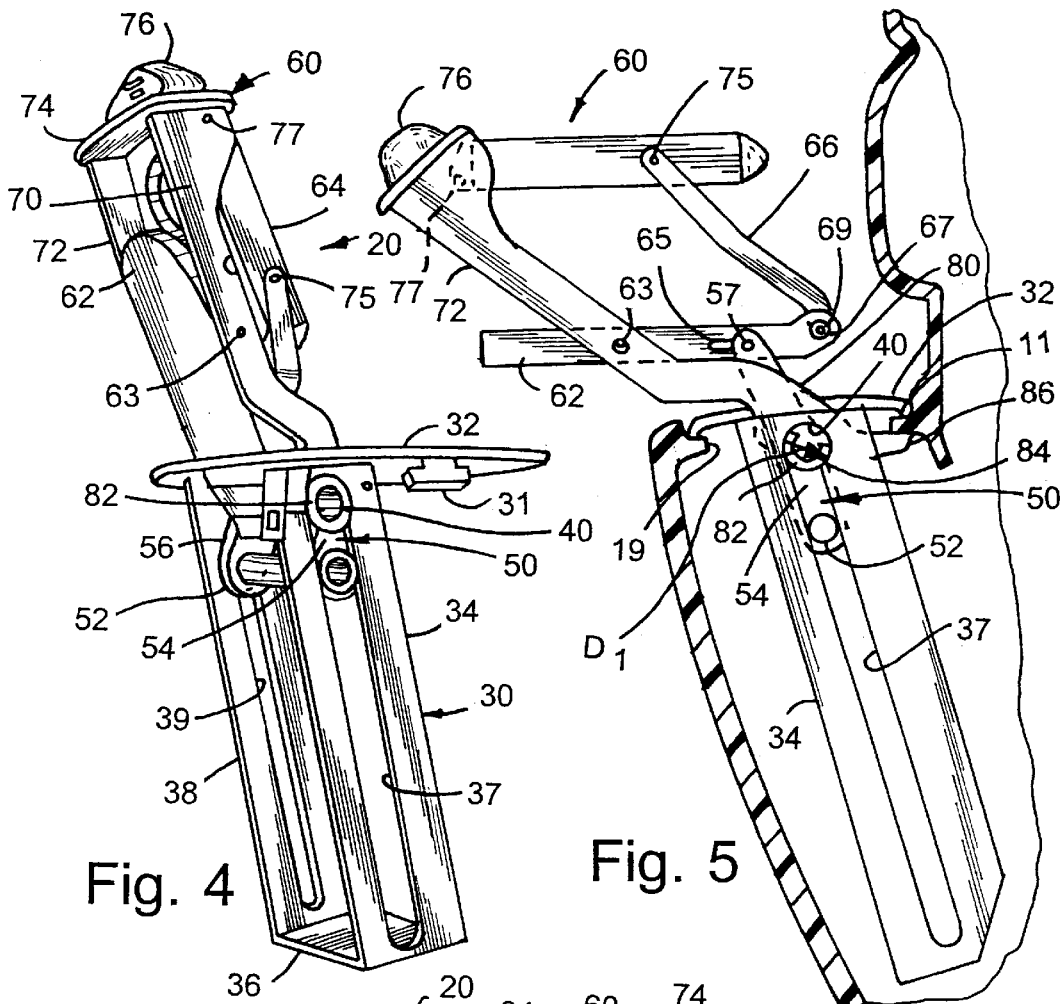
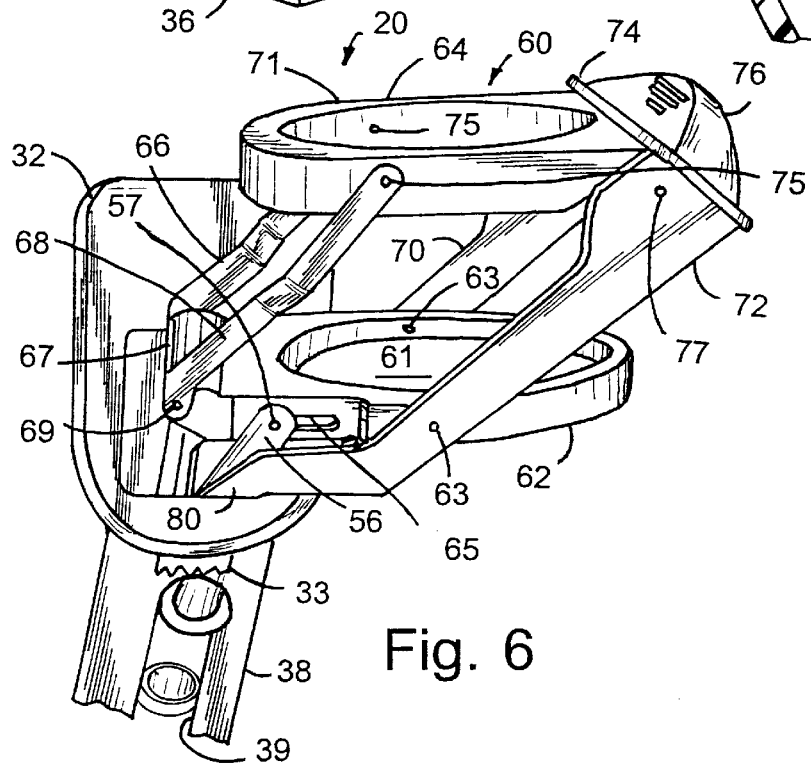

RETRACTABLE CONTAINER HOLDER

BACKGROUND OF THE INVENTION

The present invention relates to a container holder for a vehicle and one which can be retracted into a relatively small space and extended for use.

Container holders have become a popular feature in vehicles where, during commuting to and from work or other places, the driver or passengers will frequently consume a cup of coffee or a soft drink. The placement of container holders frequently posses interesting challenges for the vehicle designers inasmuch as the interior space of vehicles is becoming increasingly at a premium. There exists a variety of slide-out container holders which extend either from armrests, instrument panels, consoles or the like. U.S. Pat. Nos. 5,297,709; 4,759,584; 4,756,572; 5,018,633 and 5,259,580 are representative of container holders which extend and retract from storage slots in vehicle accessories. Although these container holders operate well within their respective environments, they require specific mounting areas for their use.

There remains a need for a very compact container holder which can be placed within a relatively shallow area of a vehicle, such as a door panel, and can be moved not only from a retracted stored position to an extended use position but as it is extended moves outwardly to provide a convenient container holder location.

SUMMARY OF THE PRESENT INVENTION

The container holder of the present invention provides a compact retractable and extendable assembly by which a relatively compact container holder assembly can be mounted within, for example, a shallow door panel of a vehicle and yet extend upwardly and outwardly sufficiently to present a container holder in a convenient location for use by the vehicle operator or passenger. The container holder of the present invention accomplishes this by providing a frame slideably supporting a slide subassembly to which a container holder is pivotally and slideably mounted such that the container holder can be raised with the slide moving within the frame for extending and retracting the container holder. Once the container holder has been extended from the frame, it is pivoted to an outward use position.

In the preferred embodiment of the invention, the container holder assembly comprises a four-bar linkage which is mounted to the slide subassembly such that when extended, the container holder defined by an upper link having an aperture therein and a lower link having a support floor which is raised above and extends outwardly from a vehicle armrest. In a preferred embodiment of the invention, the container holder also includes a locking member for interengaging said frame when the container holder is pivoted to a use position, thereby locking the container holder in an extended use position once pivoted outwardly from the slide subassembly.

The frame and slide subassemblies can include relatively large inter-fitting parts to provide smooth movement of the container holder mounted thereto from a retracted to an extended position, thereby providing a smooth acting, stable container holder which is compact and easily mounted in a vehicle in relatively small spaces. These and other features, objects and advantages of the present invention will become apparent upon reading the following description thereof together with reference to the accompanying drawings.

BRIEF DESCRIPTION OF THE DRAWINGS

FIG. 2 is an enlarged, fragmentary, cross-sectional view of the container holder shown in FIG. 1 taken along section lines II—II of FIG. 1, shown with the container holder in a retracted stored position;

FIG. 3 is a fragmentary, vertical cross-sectional view of the container holder shown in FIG. 2, shown in a first extended position raised from the stored position;

FIG. 4 is a perspective view of the container holder assembly in the position shown in FIG. 3, shown removed from the vehicle;

FIG. 5 is a vertical cross-sectional view of the container holder shown in FIGS. 2 and 3, shown in a second extended use position;

FIG. 6 is a fragmentary, perspective view of the opposite side of the container holder as seen in FIG. 5.

DETAILED DESCRIPTION OF THE PREFERRED EMBODIMENT

Figure 1:
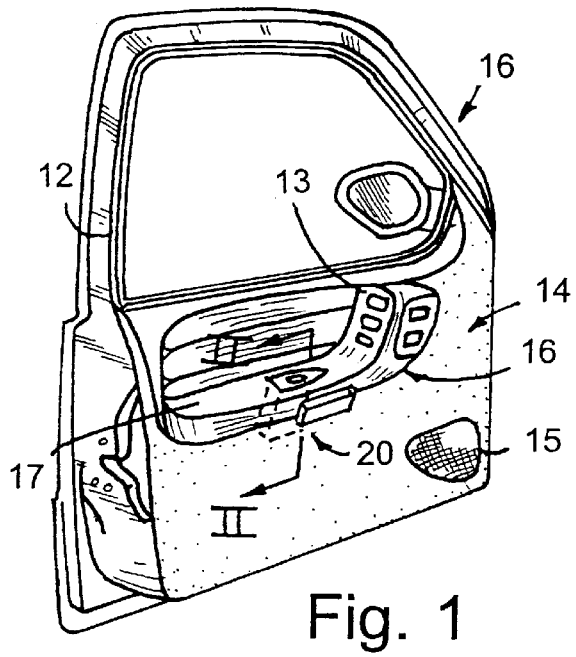
FIG. 1 is a perspective view of a door of a vehicle, such as an automobile, showing the interior door panel with a container holder assembly of the present invention mounted therein.

Referring initially to FIG. 1, there is shown a door 10 for a vehicle, such as an automobile. The door includes a frame 12 to which there is mounted on the interior a decorative door panel 14. Panel 14 integrally includes an armrest assembly 16 having a horizontal arm resting surface 17 into which the container holder assembly 20 of the present invention is mounted. The armrest assembly 16 may include control switches 13 for controlling a variety of vehicle options such as power windows, door locks and the like.

Figure 7:
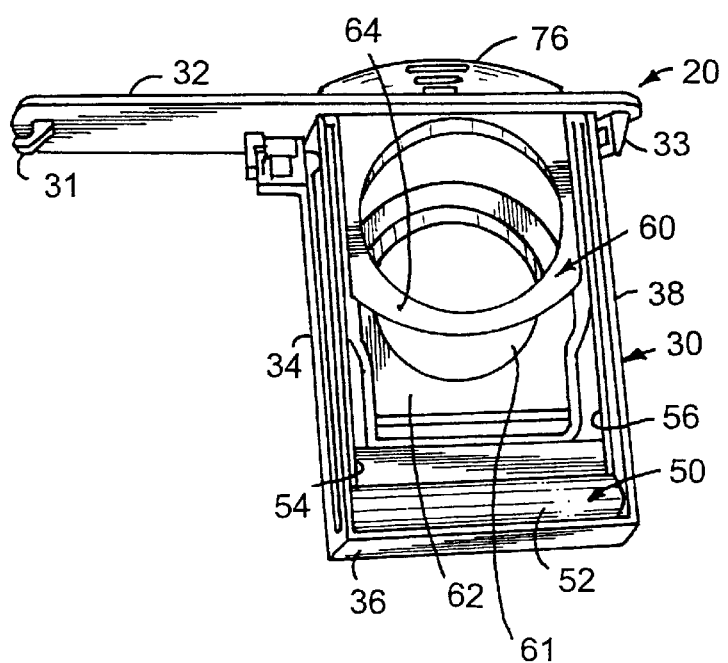
FIG. 7 is a top perspective view of the container holder assembly removed from the vehicle.

The container holder assembly 20 includes a frame subassembly 30 as best seen in FIGS. 2, 4 and 7, a slide subassembly 50 as best seen in FIGS. 3–5, which is slideably mounted to the frame subassembly 30 and movable between a lowered or retracted position, as seen in FIG. 2, to a raised position as seen in FIGS. 3–6. The container holder assembly 20 further includes a container holder subassembly 60 which is movably coupled to the slide subassembly 50 to move therewith and pivotally mounted thereto. Container holder subassembly 60 includes a parallelogram, four-bar linkage construction to allow the container holder defined by the container holder subassembly 60 to pivot from a collapsed position, as seen in FIGS. 1, 2–4 and 7, to an extended use position, as seen in FIGS. 5 and 6.

The frame subassembly 30 includes a planar bezel 32 which is shaped to fit downwardly into an opening 19 in the armrest surface 17 of the vehicle armrest assembly 16, as best seen in FIGS. 2 and 5. For such purpose, the bezel 32 includes suitable latches 31 and 33 at opposite ends which interfit with mating latches formed in the opposite edges of aperture 19. The frame can be integrally molded to include the bezel 32 and a generally U-shaped, downwardly projecting support structure comprising a first leg 34 extending downwardly from the lower surface of bezel 32 and a cross leg 36 extending from the bottom of leg 34 to the bottom of a parallel spaced second downwardly depending leg 38. Each of the legs 34, 38 include a slot 37 and 39, respectively, formed therein into which the slide subassembly and container holder subassembly travel when moved from a retracted to an extended position. The upper end of each of the slots 37 and 39 include a circular aperture 40 which defines the end of the slots 37 and 39 and which serve as a stop in connection with the container holder subassembly as described below. Thus, the frame subassembly 30 comprises an integral mounting bezel 32 and a generally U-shaped, downwardly projecting frame section which slideably supports the slide subassembly 50 and container holder subassembly 60 mounted thereto.

The slide subassembly 50 comprises a generally cylindrical cross member 52 with ends which slideably extends within slots 37 and 39 in legs 34 and 38 of the frame subassembly and to which there is fixedly mounted a pair of upwardly extending legs 54 and 56. The upper ends of each of the legs 54 and 56 include inwardly projecting pins 57 (FIG. 5) which, as described in greater detail below, slideably and pivotably fit within slots 65 (FIGS. 5 and 6) in the base platform 62 of the container holder subassembly 60. Thus, the slide subassembly is also generally U-shaped, including a cross member 52, legs 54 and 56 which project upwardly from cross member 52 and which pivotably and movably engage the container holder subassembly 60.

The container holder subassembly 60 comprises a parallelogram linkage with lower and upper links are defined by a container support base 62 and a container support upper ring 64, as best seen in FIGS. 6 and 7. The remaining portion of the parallelogram-type structure includes a pair of spaced rear arms 66 and 68 which are pivotally coupled between the lower support 62 and upper support 64 and a pair of forward, parallel arms 70 and 72, which are pivotally coupled between the upper and lower support 62 and 64 and, as best seen in FIG. 5, further extend downwardly into aperture 19 for locking the container holder subassembly 60 into position with additional structure described below. The arms 70 and 72 extend on the outer side of the slide arms 54 and 56 and fit between legs 34 and 38 of slide subassembly 30 when retracted, as seen in FIGS. 2 and 7. Coupled across the ends of arms 70 and 72 is a handle plate 74 having a handle 76 which allows the container holder subassembly 60 to be withdrawn from the stored position, as seen in FIG. 2.

The base 62 defines a platform having a floor 61 (FIGS. 6 and 7) which is recessed for supporting the bottom of a container such as a cup, soda can or the like. The sides of base 62 include slots 65 near the generally rectangular rear section of the base to receive the pins 57 of slide arms 54 and 56. Once slide 50 is raised from the retracted position shown in FIG. 2 to an extended position shown in FIGS. 3–6, pins 57 remain stationary and form the fixed position about which the container holder subassembly 60 pivotally moves to extend to the use position. The end 67 of the base platform 62 includes a pair of pivot pins 69 which pivotally mount the arms 66 and 68 to the platform. A pair of pivot pins 63 pivotally couple the base 62 to the forward arms 70 and 72 of the container holder subassembly. Thus, the four arms 66, 68, 70 and 72 are each pivotally coupled to the base platform 62 at spaced locations as is the slide subassembly 50 through pins 57. The upper ends of each of the arms 66, 68, 70 and 72 are also pivotally coupled to the upper support ring 64 of the container holder, which includes a circular opening 71 which, when in an extended position, is centered above and in parallel spaced relationship to floor 61 of base 62, as best seen in FIGS. 5 and 6. The upper end of arms 66 and 68 are pivotally coupled by pivot pins 75 to the upper support ring 64, while the upper ends of arms 70 and 72 are also pivotally coupled by pivot pins 77 to support ring 64. Thus, the support ring 64 and base 62 move in substantially parallel relationship between a folded collapsed position immediately adjacent and in contact with one another, as shown in FIGS. 2–4 and 7, to a raised spaced-apart parallel position, as shown in FIGS. 5 and 6.

Arms 70 and 72 each include downwardly projecting offset leg sections 80 which, as best seen in FIGS. 3 and 5, include a C-shaped stub axle 82 having a first cylindrical diameter $D_1$. Across the flats of the C-shaped member 82, they have a smaller dimension $D_2$ (FIGS. 2 and 3) corresponding roughly to the width of slots 37 and 39 such that the C-shaped stub axles 82 extending outwardly from each of the arms 70 and 72 allow the arms to slide within slots 37 and 39 when the container holder subassembly is retracted, as seen in FIGS. 2 and 7, and slide upwardly as illustrated in FIGS. 3 and 4 with the dimension $D_2$ substantially equal but slightly smaller than the width of slots 37 and 39. As the container holder subassembly 60 is pivoted outwardly to an extended use position, the stub axles 82 rotate, as seen in FIG. 5, with the diameter $D_1$ engaging the circular slots 40 to lock the container holder in a raised use position. It accomplishes this by the outer circular diameter of stub axles 82 engaging the corners 84 of apertures 40 in the legs 34 and 38 of frame subassembly 30, as best seen in FIG. 5. This serves to prevent the slide subassembly 50, which is also pivotally coupled to the container holder subassembly 60 through pins 57, from sliding back down slots 37 and 39 when the container holder is extended for use. Leg extensions 80 further include a tip 86 which engages an extension 11 (FIG. 2) in the door panel aperture 19 for providing additional support to the container holder subassembly 60 once extended to a use position. As can be appreciated, as the container holder subassembly 60 is pivoted from the collapsed position shown in FIGS. 3 and 4 to the extended use position shown in FIGS. 5 and 6, the stationary pin 57 allows the slot 65 in base platform to move with respect to the pin from one extreme end position to the opposite end position (FIGS. 3 and 5), while forcing the arms 66, 68, 70 and 72 to pivot the base 62 and container ring 64 to their extended use position under the influence of a downward force applied to handle 76 by the user of the container holder.

The container holder assembly 20, although relatively compact and easily fitted within a door panel, as illustrated, includes a frame subassembly 30 with relatively large slots 37 and 39 for receiving the cylindrical crossbar 52 of the slide subassembly. These members are relatively large and, therefore, allow easy movement of the entire container holder subassembly 60 from a stored retracted position to an extended use position in a relatively compact space, thereby providing smooth acting, reliable operation of the container holder subassembly within the frame subassembly. Further, the unique locking mechanism associated with the arms 70 and 72 provides further stability of the container holder subassembly through the smaller dimension $D_2$ of the C-shaped locking stub axles 82 as the container holder subassembly is extended and subsequently locks the container holder in a use position once rotated to allow the larger diameter $D_1$ to engage the edge 84 of apertures 40 in slots 37 and 39 holding the container holder subassembly in an extended use position with respect to the frame subassembly. Although, axles 82 are hollow generally C-shaped members, solid D-shaped extensions could also be employed and other configurations with different dimensions to provide the desired locking action with rotation of the container holder would provide equivalent operation.

It will become apparent to those skilled in the art that various modifications to the preferred embodiment described herein can be made without departing from the spirit or scope of the invention as defined by the appended claims.

I claim:

1. A container holder assembly for a vehicle comprising:
   a frame subassembly having a bezel and a slide-receiving support;
   a slide subassembly having a member slideably extending in said support and legs extending therefrom in parallel spaced relationship with pins extending from said legs at an end opposite said member; and a container holder subassembly including a parallelogram linkage in which at least two of the links form a container support base and container support ring coupled in parallel spaced relationship to said container support base, said container subassembly pivotally and slideably mounted to said pins of said slide subassembly.

2. The container holder assembly as defined in claim 1 wherein said bezel of said frame subassembly includes an aperture through which said container holder assembly extends.

3. The container holder assembly as defined in claim 1 wherein said slide-receiving support comprises a pair of legs coupled at one end to said bezel and a cross member coupled between said legs at a position remote from said bezel.

4. The container holder assembly as defined in claim 3 wherein each of said legs of said slide-receiving support includes a slot for receiving said member of said slide subassembly.

5. The container holder assembly as defined in claim 4 wherein each of said slots of said legs of said slide-receiving support terminate in a circular aperture at an end proximate said bezel.

6. The container holder assembly as defined in claim 5 wherein said container subassembly includes generally C-shaped axles extending into said slots such that said axles slide within said slots as said container holder is moved from a retracted position to a use position.

7. The container holder assembly as defined in claim 6 wherein said axles rotate in said circular apertures for use with said axles lockably engaging the intersection of said slots and circular apertures.

8. A container holder assembly for a vehicle comprising:

a frame having a pair of parallel spaced legs extending from a member shaped for attachment to a vehicle, each of said legs including an elongated slot having parallel spaced-apart edges and terminating at one end in an enlarged circular aperture;

a slide assembly having a member slideably extending in said slots between said legs of said frame; and a container holder including a container support base pivotally mounted to said slide assembly, said container holder including at least one locking member extending into one of said slots of said frame, said locking member shaped to present a first dimension allowing said member to slide within said slot and a second dimension greater than said first dimension such that when said container holder is rotated to a use position with said locking member positioned in said circular aperture, said locking member is lockably held in said circular aperture of said slot.

9. The container holder assembly as defined in claim 8 wherein said slide assembly includes pins extending therefrom and said container holder support base includes slots for pivotally and slideably receiving said pins of said slide assembly.

10. The container holder assembly as defined in claim 9 wherein said frame includes a bezel having an aperture through which aid container holder extends.

11. The container holder assembly as defined in claim 10 wherein said locking member includes a generally C-shaped axle extending into at least one of said slots such that said axle slides within said slot as said container holder is moved from a retracted position to a use position.

12. The container holder assembly as defined in claim 11 wherein said axle rotates in said circular aperture of said at least one slot for use with said axle lockably engaging the intersection of said slot and circular aperture.

13. A container holder for a vehicle comprising:

a container support base mounted to a container support ring by links pivotally coupling said base and ring for movement between a spaced-apart position for use and a collapsed position for storage; and a slide and means for mounting said slide to a vehicle for movement of said container holder between a retracted stored position and an extended use position, and means interconnecting said slide and one of said base and ring for moving said base and ring away from each other to said spaced-apart position for use as said ring is pivoted with respect to said slide, wherein said mounting means includes a frame having at least one leg with an elongated slot, and wherein said slide includes a member extending within said slot for guided support of the movement of said slide.

14. The container holder as defined in claim 13 wherein said frame includes a bezel with an opening for receiving said container support base and container support ring, and wherein said leg extends from said bezel.

15. The container holder as defined in claim 14 wherein said bezel includes projections for snap-locking said bezel into an aperture formed in a vehicle support member.

16. The container holder as defined in claim 14 wherein said slot includes a circular aperture at an end proximate said bezel and wherein at least one of said links includes a locking member which extends into said slot and lockably engages said circular aperture when said support ring moves away from said support base.

17. The container holder as defined in claim 16 wherein said locking member comprises a generally C-shaped axle extending from a side of said one of said links.

18. A container holder for a vehicle comprising:

a container support base mounted to a container support ring by links pivotally coupling said base and ring for movement between a spaced-apart position for use and a collapsed position for storage; and a slide and means for mounting said slide to a vehicle for lineal movement of said container holder between a retracted stored position and an extended use position, and means interconnecting said slide and one of said base and ring for moving said base and ring away from each other to said spaced-apart position for use as said ring is pivoted with respect to said slide.

19. The container holder as defined in claim 18 wherein said means interconnecting said slide and one of said base and ring comprises at least one pin extending from said slide and a slot formed in said base for receiving said pin such that when said slide is extended, rotation of said ring effects movement of said ring away from said base.

20. The container holder as defined in claim 19 and further including a handle on said ring for withdrawing said ring and slide from a retracted position.

* * * * *